United States Patent
Wang et al.

(10) Patent No.: US 10,867,204 B2
(45) Date of Patent: Dec. 15, 2020

(54) FRAME LEVEL AND VIDEO LEVEL TEXT DETECTION IN VIDEO

(71) Applicant: HULU, LLC, Santa Monica, CA (US)

(72) Inventors: Yaqi Wang, Beijing (CN); Xiaohui Xie, Beijing (CN); Yunsheng Jiang, Beijing (CN)

(73) Assignee: HULU, LLC, Santa Monica, CA (US)

( * ) Notice: Subject to any disclaimer, the term of this patent is extended or adjusted under 35 U.S.C. 154(b) by 57 days.

(21) Appl. No.: 16/399,823

(22) Filed: Apr. 30, 2019

(65) Prior Publication Data

US 2020/0349381 A1   Nov. 5, 2020

(51) Int. Cl.
*G06K 9/34* (2006.01)
*G06K 9/00* (2006.01)

(52) U.S. Cl.
CPC ......... *G06K 9/344* (2013.01); *G06K 9/00718* (2013.01); *G06K 9/00744* (2013.01); *G06K 2209/01* (2013.01)

(58) Field of Classification Search
CPC ............... G06K 9/344; G06K 9/00718; G06K 9/00744; G06K 9/34; G06K 9/00; G06K 9/18
USPC .................................................. 382/103, 176
See application file for complete search history.

(56) References Cited

U.S. PATENT DOCUMENTS

| | | | |
|---|---|---|---|
| 2012/0134588 A1* | 5/2012 | Zhang .................. | G06K 9/3275 382/176 |
| 2013/0194448 A1* | 8/2013 | Baheti .................. | G06K 9/3258 348/222.1 |
| 2014/0112527 A1* | 4/2014 | Nister .................. | G06K 9/3266 382/103 |

* cited by examiner

*Primary Examiner* — Congvan Tran
(74) *Attorney, Agent, or Firm* — Fountainhead Law Group, PC (57) ABSTRACT

In some embodiments, a method detects a first set of frames in a video that include lines of text, the detecting performed at a frame level on each individual frame. A first representation is generated from the first set of frames and a second representation is generated from the first set of frames. The method filters the first representation based on a number of lines of text within a space in the space dimension to select a second set of frames and filters the second representation based on a number of frames within time intervals in the time dimension to select a third set of frames. Frames in both the second set of frames and the third set of frames are analyzed to determine whether the lines of text in both the second set of frames and the third set of frames are burned-in subtitles.

20 Claims, 8 Drawing Sheets

FRAME LEVEL AND VIDEO LEVEL TEXT DETECTION IN VIDEO

BACKGROUND

Text may be stored in images of a video. For example, one type of text may be a "burned-in subtitle", which may be subtitle text that is permanently included in an image and cannot be manipulated automatically. That is, a burned-in subtitle is different from captions in that the burned-in subtitle is part of the images of the video, while a caption may be overlaid on the video and thus can be manipulated externally from the video.

A burned-in subtitle is displayed in a single language typically, such as the local language in which the video was created. Special processing may need to be performed when a video has burned-in subtitles. For example, when a video has burned-in subtitles, a video delivery system may need to translate the burned-in subtitles into different languages for different locations in which the video will be offered. For example, a Japanese version of the video will require Japanese subtitles.

To perform the translation, the video delivery system needs to know which videos in a video library include burned-in subtitles and the language of the burned-in subtitles. A human user may have to view the entire video to determine whether or not burned-in subtitles exist in each video in the library. This may take a long time in addition to using manual resources.

DETAILED DESCRIPTION

Described herein are techniques for a video analysis system. In the following description, for purposes of explanation, numerous examples and specific details are set forth in order to provide a thorough understanding of some embodiments. Some embodiments as defined by the claims may include some or all of the features in these examples alone or in combination with other features described below and may further include modifications and equivalents of the features and concepts described herein.

Some embodiments provide a framework that can analyze a video and determine whether or not the video includes burned-in subtitles. Additionally, some embodiments can determine the language of the burned-in subtitle. A system may detect whether a video has subtitles within frames of the video. The detection may be performed on a frame level in which each frame is analyzed individually to determine whether subtitles are included in a respective frame. The frame level prediction may not accurately predict whether a video has burned-in subtitles, however. For example, some detected subtitles may be text for a logo, advertising board, opening credits, closing credits, news tickers, and other text types that are shown in the video.

The system then performs a video level analysis on the frames that include the detected subtitles to detect whether the frames include burned-in subtitles as compared to other types of text. The video level analysis outputs a second set of frames that are determined to include burned-in subtitles. The system then can determine whether or not the video includes burned-in subtitles based on the second set of frames. For example, the system may determine whether or not the number of frames in the second set of frames is above or below a threshold where having a number of frames above a threshold indicates that the video has burned-in subtitles. Other characteristics may also be used, such as the concentration of frames within a time interval.

If a video is detected to have burned-in subtitles, then the system may detect the language of the burned-in subtitles. Once detecting the language, the system outputs an indication as to whether the video has burned-in subtitles and the language of the burned-in subtitles. The system may also output other information, such as the frame numbers that include the burned-in subtitles.

System Overview

Figure 1:
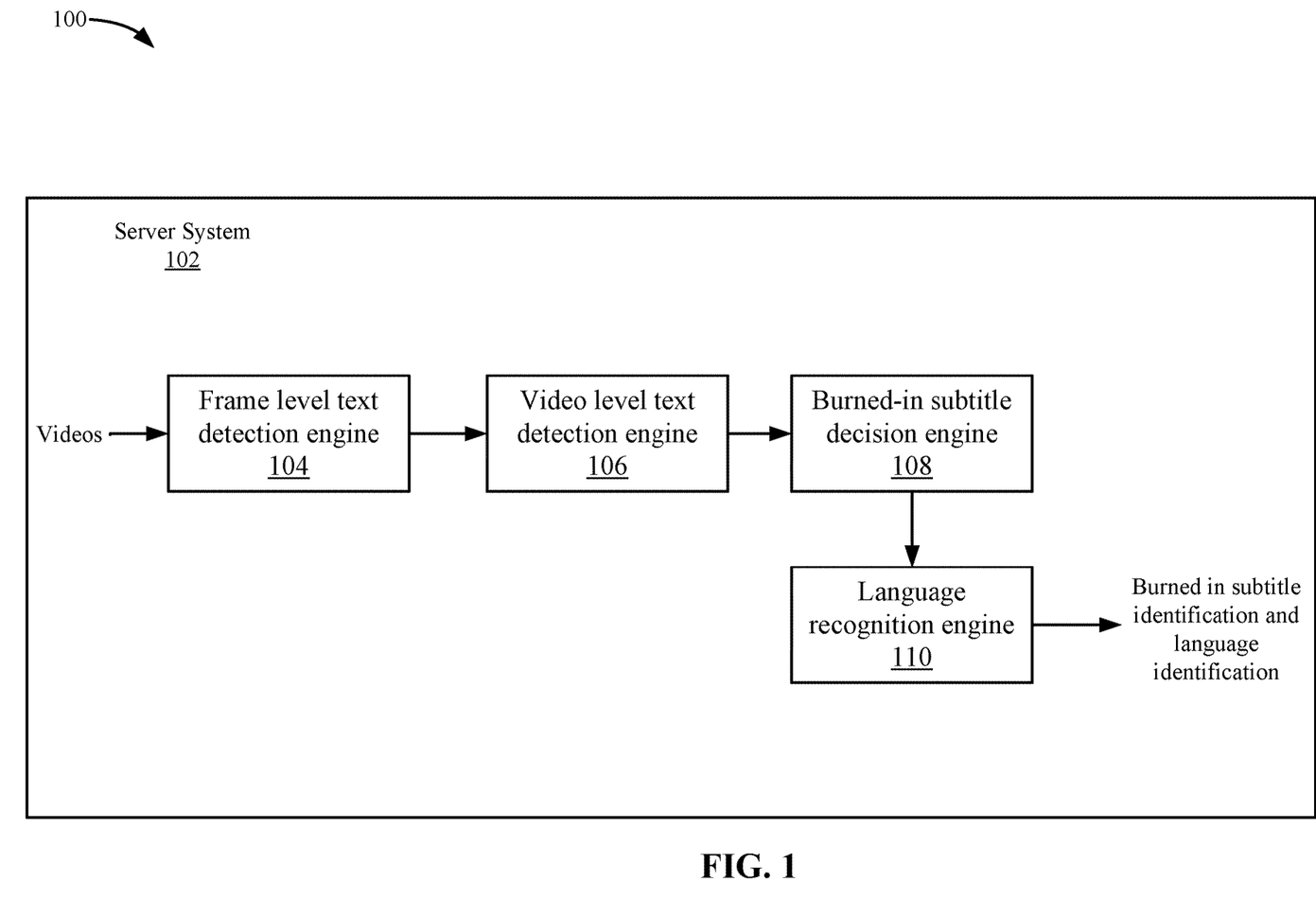
FIG. 1 depicts a simplified system for analyzing videos for text according to some embodiments.

FIG. 1 depicts a simplified system 100 for analyzing videos for text according to some embodiments. System 100 includes a server system 102 that includes one or more computing devices. The functions described may be distributed across multiple computing devices or performed by a single computing device.

Server system 102 includes a frame level text detection engine 104, a video level text detection engine 106, a burned-in subtitle decision engine 108, and a language recognition engine 110. Frame level text detection engine 104 receives videos. For example, a video delivery system may offer a number of videos in their library. The video delivery system may need to determine which videos include burned-in subtitles. Also, the video delivery system may need to determine the language of the burned-in subtitles. In some examples, the video delivery system may offer the videos in different international locations and the burned-in subtitles need to be changed to the local language in each location. In some embodiments, a burned-in subtitle may be text that is added to a frame of the video. The frame may be an image and may include the text for a subtitle and the sub-title is not inserted at the client. For example, the burned-in subtitle may be dialogue for speech in the video, such as a translation of the speech in the video. The burned-in subtitle is different from other text types in the video. For example, the burned-in subtitle may be text that is added to the video by a content provider in a source video that is received by the video delivery system. The burned-in subtitle is different from other text in the video, such as logos, news tickers, billboards because the burned-in subtitle may include text that corresponds to speech from content in the video. As discussed above, the burned-in subtitle is different from using a caption file that is used to display captions that are overlaid on the images of the video because the burned-in subtitle must be changed in the frame of the video. To change the language of a caption file, the video delivery service can use a different caption file that includes captions that are overlaid on the video.

Frame level text detection engine 104 may sample frames in a video and detect frames that include lines of text. Frame level text detection engine 104 performs the analysis on individual frames. That is, to make a decision of whether a frame has text or not, frame level text detection engine 104 only analyzes content of that individual frame. Then, frame level text detection engine 104 may output a first set of frames that include lines of text.

Video level text detection engine 106 analyzes the first set of frames at a video level. The video level may mean making a decision on whether a frame has a burned-in subtitle using an analysis that is based on multiple frames. For example, video level text detection engine 106 may summarize the frame level results from multiple frames. In some embodiments, video level text detection engine 106 generates a first representation using a space dimension from the first set of frames. Then, video level text detection engine 106 selects a second set of frames from the first set of frames by filtering in the space dimension. After which, video level text detection engine 106 generates a second representation using a time dimension from the second set of frames. Then, video level text detection engine 106 selects a third set of frames from the second set of frames by filtering in the time dimension. The filters take into account video level information, such as an aggregation of the position of the lines of text in the first set of frames (e.g., the space dimension) and also an aggregation of the number of frames within interval time intervals (e.g., the time dimension). Accordingly, video level text detection engine 106 then filters based on the space dimension and the time dimension to generate a set of frames that are detected to include burned-in subtitles.

Burned-in subtitle decision engine 108 may then determine whether or not the video includes burned-in subtitles. For example, burned-in subtitle decision engine 108 analyzes the third set of frames to determine whether or not the third set of frames include burned-in subtitles. In some embodiments, burned-in subtitle decision engine 108 compares the number of frames in the third set of frames to a threshold. If the number of frames is above a threshold, burned-in subtitle decision engine 108 determines that the video includes burned-in subtitles. If not, burned-in subtitle decision engine 108 determines that the video does not include burned-in subtitles. When the result of the analysis is above the threshold, the video is determined to include burned-in subtitles because that many frames with text that pass through video level text detection engine 106 and frame level text detection engine 104 typically means the video includes burned-in subtitles. That is, the characteristics of frames that pass through both the video level and the frame level filters most likely means that the video includes burned-in subtitles if the number of frames is over a certain amount. The threshold is set such that a very small amount, such as one or two frames, does not trigger a determination that the video includes burned-in subtitles.

If burned-in subtitle decision engine 108 determines that a video includes burned-in subtitles, then language recognition engine 110 may detect the language of the burned-in subtitles in the frames. Language recognition engine 110 then outputs an indication that a video includes burned-in subtitles and the language that is detected.

Frame Level Text Detection Engine

Figure 2:
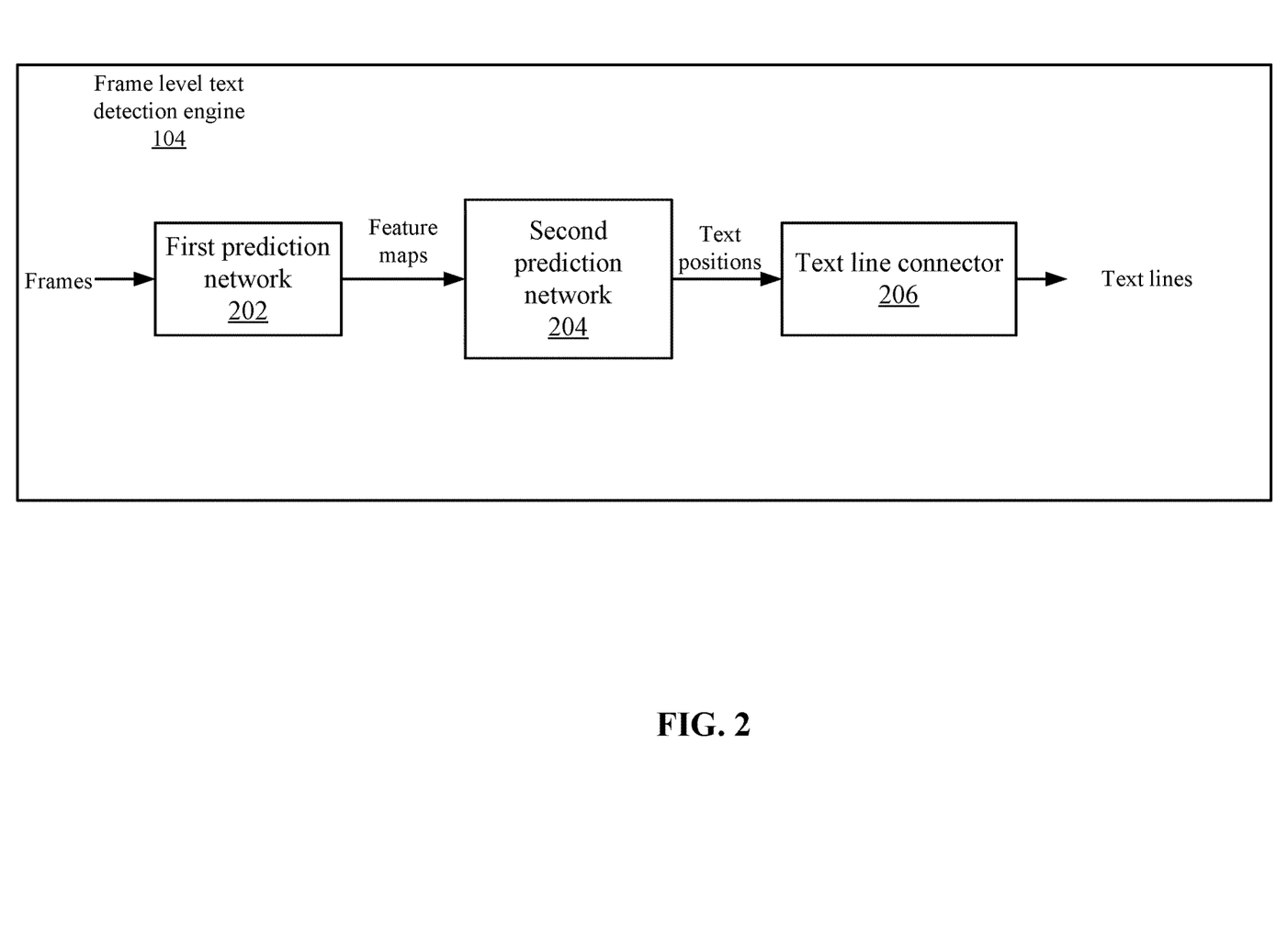
FIG. 2 depicts a more detailed example of frame level text detection engine according to some embodiments.

FIG. 2 depicts a more detailed example of frame level text detection engine 104 according to some embodiments. For each video, frame level text detection engine 104 may sample a number of frames. In some embodiments, frame level text detection engine 104 may sample every frame in the video. However, frame level text detection engine 104 may sample less than every frame in the video, such as around 200 frames for a video. Frame level text detection engine 104 may sample less than every frame because subtitles in the videos are usually dense and each can last up to a few seconds (which cover multiple frames) and a lower sample rate than every single frame in the video may be sufficient to detect the presence of burned-in subtitles. Also, in some embodiments, only part of the frame may be analyzed, such as the bottom one-third of the frame because a burned-in subtitle may always appear in that area. However, areas other than the bottom third of the frame may be used, such as a right third or left third of the frame when subtitles are more likely to appear in these areas. Also, frame level text detection engine 104 may not cut out any part of the frames. But cutting out part of the frames may filter a lot of unrelated text and accelerate the analysis.

A first prediction network 202 receives the sampled frames from the video and may perform a first prediction to determine whether or not frames include text lines. In some embodiments, first prediction network 202 is a neural network, such as a deep neural network, that can accurately predict which pixels include text lines in the images. For example, first prediction network 202 may generate a sequence of proposals of fine-scale text based on convolutional intra-maps that are output by a convolutional neural network. A proposal is a small rectangle region on the frame. The generated text proposals from the neural network represent the possibility of text appearing in a respective region is high according to the calculation by first prediction network 202. Since each text proposal may only contain one or part of a character, and text usually appears in a sentence that includes multiple characters, those text proposals, most likely will form a sequence, which is a text line. In some embodiments, first prediction network 202 may receive pixels of the frame, and output a feature map for the frames. The feature map may indicate sequences of regions that may include a feature, such as a sequences of characters. The values may be a probability that a small region includes a character.

A second prediction network 204 receives the feature map and can output a second feature map. For example, a recurrent neural network (RNN), such as bi-directional long-short term memory (BLSTM) neural network, may analyze the first feature map to explore the connection information between proposals and generate a more accurate feature map. Second prediction network 204 generates a more accurate feature map by using more context information while first prediction network 202 predicted each text proposal separately. However, these text proposals are not independent of each other. For example, if only one small region is reviewed, it is hard to distinguish some non-text regions that have similar structure as some text but are not text, such as leaves from a tree, fences from a house, and windows in a house. Also, some weak or ambiguous regions that contain actual text may fail to be detected. Different from convolutional neural network, a recurrent neural network (RNN) leverages context information. Second prediction network 204 receives the feature map from prediction network 202, and adding context information improves the accuracy of the prediction.

Second prediction network 204 outputs a second feature map that indicates refined sequences of text proposals. The output format is same as the first feature map, but the scores on the feature map, which indicate the probability that a proposal contains text, are updated.

Figure 3A:
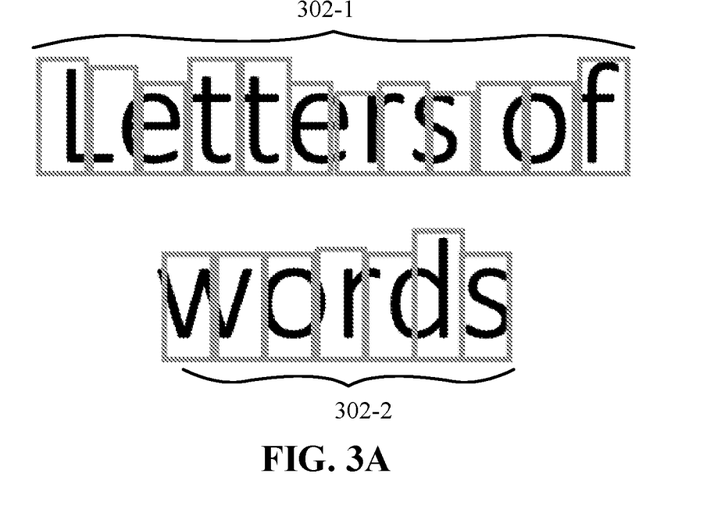
FIG. 3A depicts the output of a second prediction network where lines of individual text proposals have been connected together to form the lines according to some embodiments.
Figure 3B:
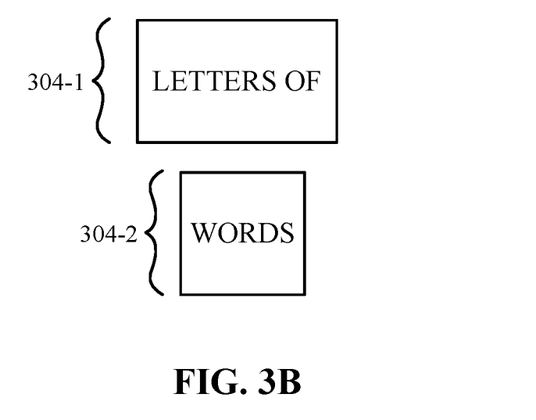
FIG. 3B depicts an example of connecting the text proposals together into a line of text according to some embodiments.

A text line connector 206 then connects the sequential proposals that belong to the same text line. The text proposals may be single bounding boxes that are associated with single character, multiple characters, or part of a character. Then, text line connector 206 may connect multiple bounding boxes into a single bounding box. For example, if the three words "LETTERS OF WORDS" are found in a frame next to each other and separated by spaces, second prediction network 204 may detect a list of characters or character parts. Then, text line connector 206 analyzes the sequential proposals of the text positions to generate a text line of "LETTERSOFWORDS". FIGS. 3A and 3B depict an example of performing a text line connection according to some embodiments. FIG. 3A depicts the output of second prediction network 204 where lines of individual text proposals have been connected together to form the characters at 302-1 and 302-2 according to some embodiments. The characters may each be surrounded by one or several bounding boxes. Then, FIG. 3B depicts an example of connecting the text proposals together into a line of text according to some embodiments. For example, one line of text at 304-1 has been connected as "LETTERS OF" and a second line of text has been connected together as "WORDS" at 304-2. Accordingly, text line connector 206 connected the text lines that were sequentially located next to each other into lines of text. In some embodiments, text line connector 206 may connect lines of text into a line when the text may be located within a threshold of one another along a coordinate space. For example, the characters in a line may be located along a similar coordinate space, such as a horizontal line or area. By connecting individual text proposals together, subtitles can be formed.

Video-Level Text Detection Engine

Figure 4:
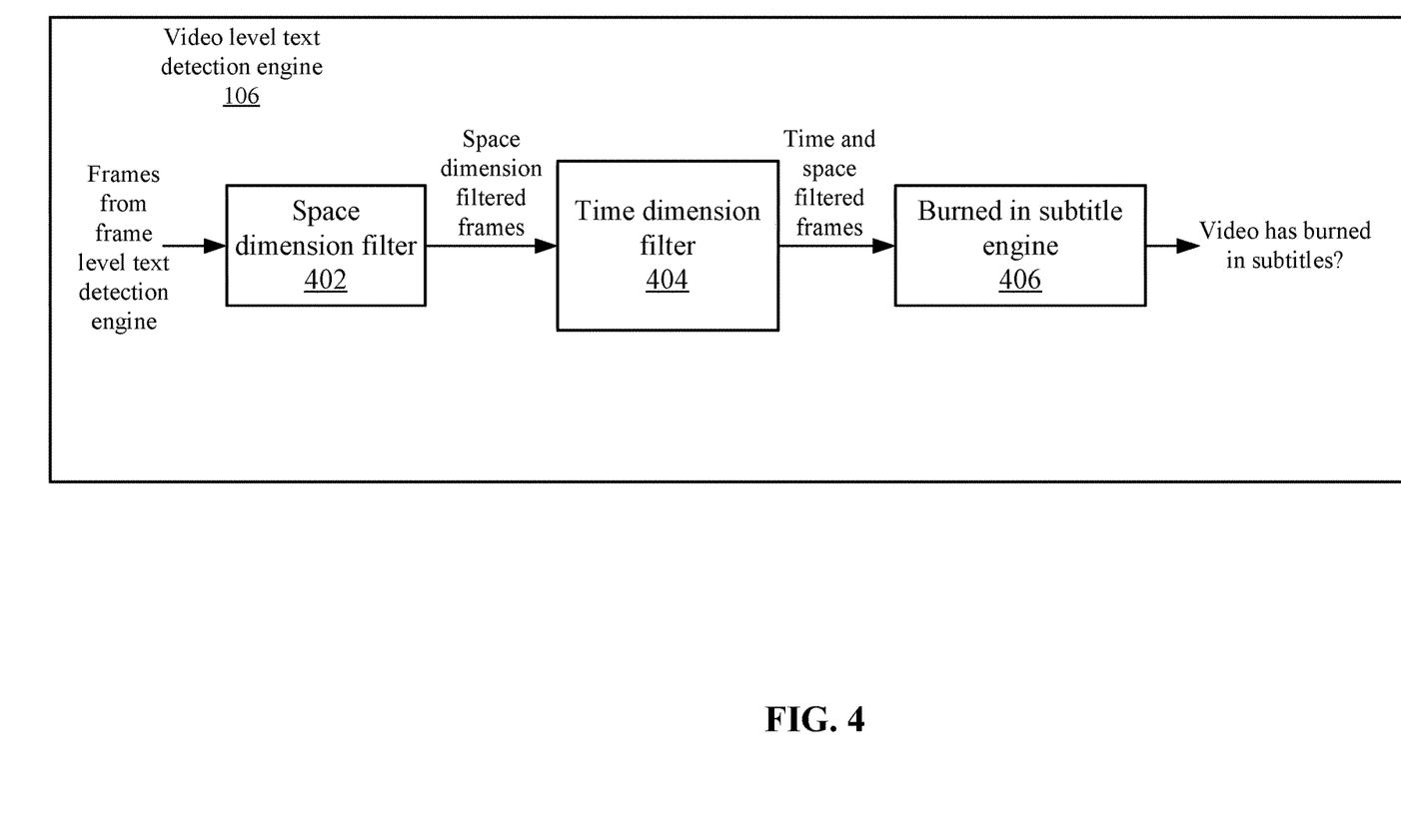
FIG. 4 depicts a more detailed example of a video level text detection engine according to some embodiments.

FIG. 4 depicts a more detailed example of video level text detection engine 106 according to some embodiments. Video level text detection engine 106 may process the first set of frames received from frame level text detection engine 104. Frame level text detection engine 104 analyzes general text in a single frame. However, video level text detection engine 106 analyzes the first set of frames from frame level text detection engine 104 at the video level. The video delivery system requires that burned-in subtitles be distinguished from other text types that may appear in the frames, such as advertising boards, news tickers, opening and closing credits, and occasional captions. The analysis at the video level helps to separate the burned-in subtitles from the other text types.

Figure 5A:
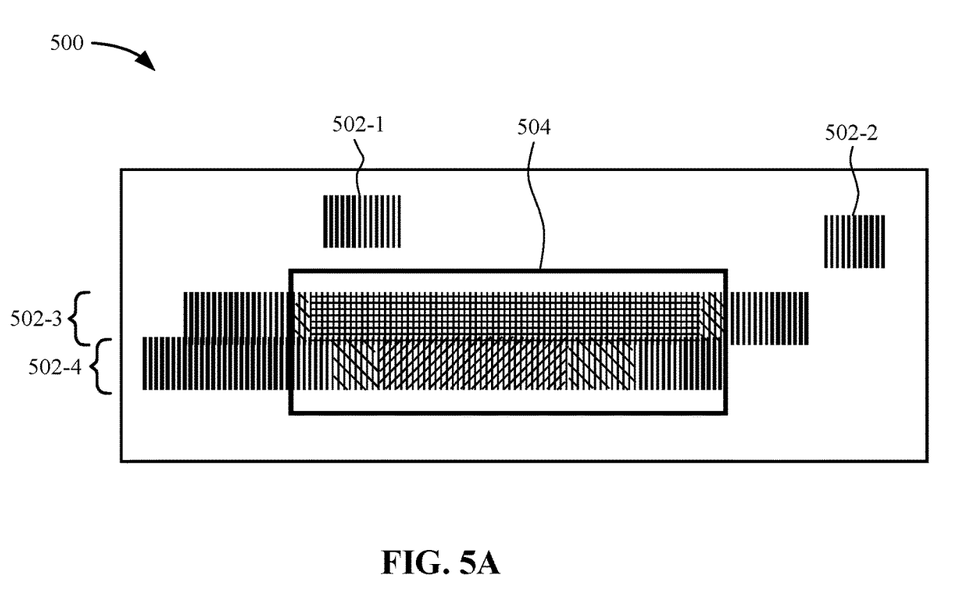
FIG. 5A shows an example of a representation for the space dimension according to some embodiments.

A space dimension filter 402 receives the first set of frames and applies a filter based on a space dimension. For example, space dimension filter 402 creates a representation from the first set of frames that is based on the positioning of the text lines. In some examples, space dimension filter 402 creates a structure, such as a heat map, that indicates the number of times a detected line of text appears in the first set of frames. For example, space dimension filter 402 uses the center line of a detected line of text (or box surrounding the line of text) and increments the value of a position in the heat map when a detected line of text appears at the position. FIG. 5A shows an example of a representation 500 for the space dimension according to some embodiments. At 502-1 to 502-4, different lines of text have been detected at varying amounts. Various shading in FIG. 5A may indicate different values in the heat map, such as darker areas may be areas in which a higher number of lines of text were detected.

Space dimension filter 402 then dynamically determines a border 504 that selects a portion of the heat map. For example, border 504 may surround an area of the heat map that has values that are above a threshold. This indicates that text boxes were detected in a number of frames above the threshold within this space. In some embodiments, the text boxes whose center lie inside the area, which has values that are above the threshold, will be kept and other boxes will be discarded. The size of bounding box 504 is the smallest rectangle (or another shape) that can cover all the remaining boxes.

Because subtitles may be relatively stable in terms of where they appear and other text types may more randomly appear, space dimension filter 402 selects a border 504 that may make it more likely that burned-in subtitles appear in this space. Space dimension filter 402 then selects a second set of frames that include text boxes within border 504.

Referring back to FIG. 4, a time dimension filter 404 then filters the second set of frames that were filtered by the space dimension using a time dimension. It is noted that the time dimension filter may be performed before the space dimension filter. Time dimension filter 404 may determine time intervals, such as one-minute time intervals and analyze the frames in each time interval. In some examples, time dimension filter 404 may use the number of text boxes within the time interval to determine a text box distribution over time. In other examples, time dimension filter 404 may use the number of frames within a time interval.

Figure 5B:
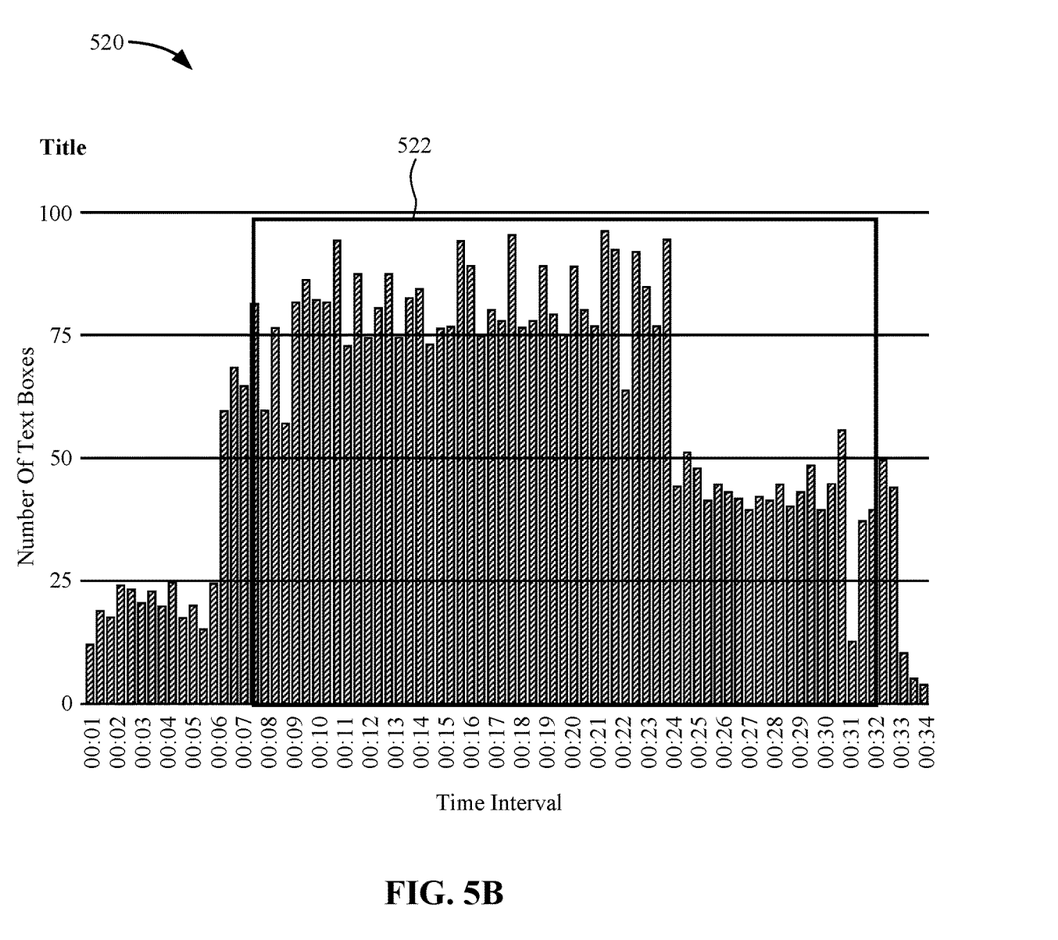
FIG. 5B shows an example of a distribution over time of text boxes according to some embodiments.

Time dimension filter 404 may build a representation over time that shows the distribution. FIG. 5B shows an example of a distribution over time of text boxes according to some embodiments. Each bar in representation 520 may correspond to a time interval. The higher the bar indicates that more text boxes were detected within the time interval. In some examples, the number of text boxes within an interval may indicate that it is more likely that a burned-in subtitle exists. One reason is that some text types may be randomly included within a time interval and may only appear within a frame or two. However, burned-in subtitles may appear within most frames in a time interval thus resulting in a higher level for the bar.

Time dimension filter 404 may determine one or more borders 522 that include a distribution over time that is above a threshold. For example, time dimension filter 404 may generate a border 522 that surrounds a number of bars that have a value above a threshold. The number of bars may be consecutive bars. Or, the number may include some intervals that may be missing, but are within a limit, such as eight out of ten intervals may include a bar over the threshold. Although only one border 522 is shown, time dimension filter 404 may draw borders 522 around any number of clusters of bars that have a value over a threshold. This results in any number of borders 522 over the text box distribution over time. Time dimension filter 404 then outputs time dimension filtered and space dimension filtered frames. For example, frames from within time intervals of border 522 are output.

Once the time dimension filtered and space dimension filtered frames are selected, burned-in subtitle engine 406 determines if the video has burned-in subtitles or not. For example, burned-in subtitle engine 406 may make a binary decision as to whether the video includes burned-in subtitles or does not include burned-in subtitles. In other examples, burned-in subtitle engine 406 may output a score that indicates the confidence level of whether the video has burned-in subtitles. In some embodiments, burned-in subtitle engine 406 compares the number of time dimension and space dimension filtered frames to a threshold. If the number of time dimension and space dimension filtered frames is above a threshold, burned-in subtitle engine 406 determines that the video has burned-in subtitles. If the time dimension and space dimension filtered frames are below the threshold, then burned-in subtitle engine 406 determines that the video does not include burned-in subtitles.

Language Recognition

Language recognition engine 110 recognizes a language type if burned-in subtitles are found in the video. In some embodiments, language recognition engine 110 receives an input that includes the detected text lines from each frame output by time dimension filter 404. Language recognition engine 110 then recognizes the language type of the text. The output of language recognition engine 110 may be a language, such as Korean, Japanese, Spanish, etc. By only performing the language recognition on the detected text lines, the language recognition may be more accurate and avoid false positives. For example, other text types will not affect the language detection. Video level text detection engine 106 removed some text that may not be subtitles, such as logos, and thus language recognition engine 110 does not perform the analysis on text that may alter the results.

Figure 6:
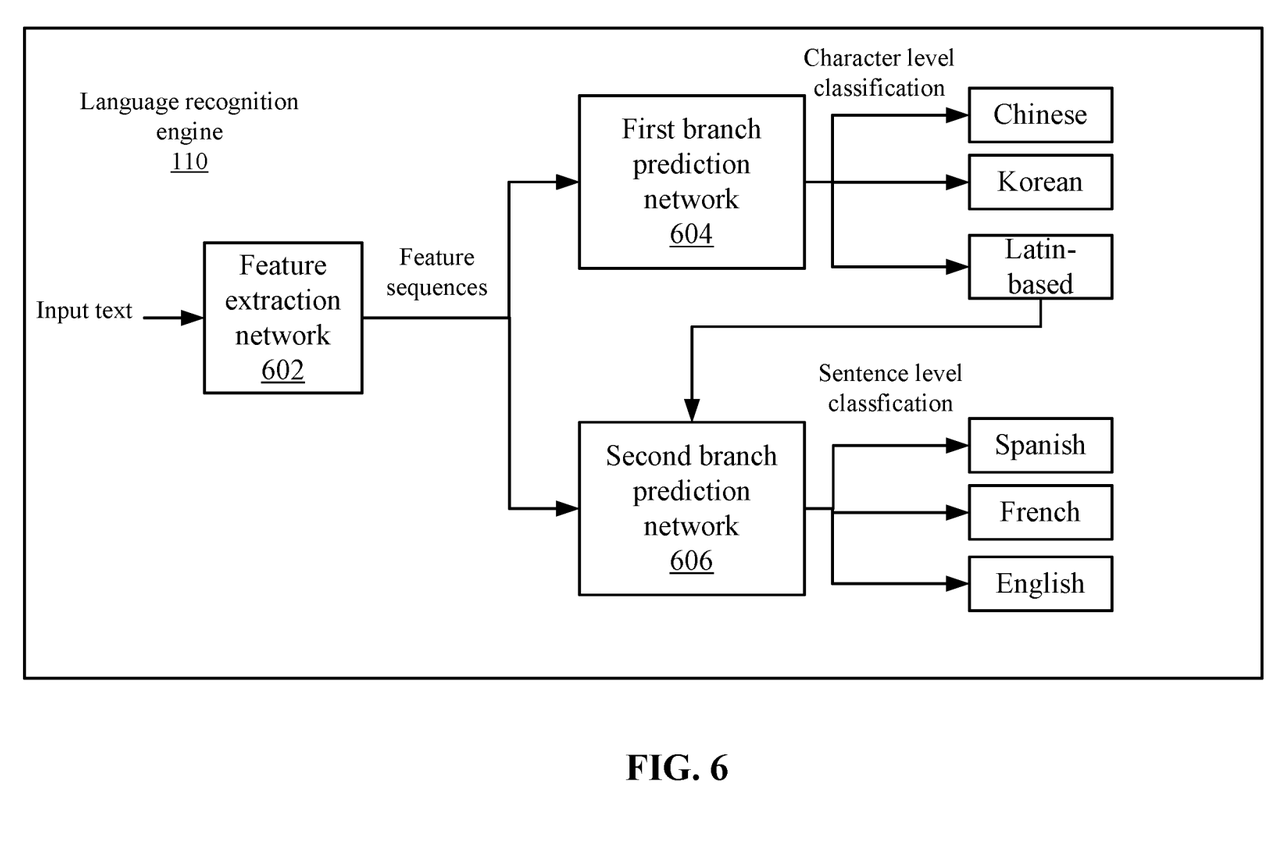
FIG. 6 depicts a more detailed example of language recognition engine according to some embodiments.

FIG. 6 depicts a more detailed example of language recognition engine 110 according to some embodiments. Language recognition engine 110 uses two branches to recognize the language. For example, some language types (e.g., non-Latin-based languages) are defined by different character types, such as in Japanese, Chinese, and Korean languages. However, some other languages (e.g., Latin-based languages) use the same characters, but can be recognized by analyzing at the sentence level.

Language recognition engine 110 receives an input text image, such as an image cropped from a frame that contains a sentence, and inputs the text into feature extraction network 602. Feature extraction network 602 extracts visual features from the input text. In some embodiments, feature extraction network 602 includes a convolutional neural network that outputs a feature map of the input text. The feature map may indicate values for pixels that may include a feature, such as a line. The values may be a probability of what character is included in the pixel. Feature extraction network 602 then generates a feature sequence. The feature sequence is a sequence of feature vectors where each feature vector is a single column from the feature map, from left to right. The sequence of features may then be input into another neural network, such as a long short term memory network.

From the feature sequence, a branching occurs that splits the analysis process to a first branch prediction network 604 and a second branch prediction network 606. Conventionally, networks may only deal with a single character type. However, the video delivery system includes videos that include burned-in subtitles with multiple character types and language recognition engine 110 needs to recognize different language types. First branch prediction network 604 performs a character level classification and second branch prediction network 606 performs a sentence level classification. In some embodiments, first branch prediction network 604 includes a long short term memory network that can classify characters into language types, such as Japanese, Korean, Chinese, etc. Another language type is Latin-based, which is a generalization that the burned-in subtitles are not distinguishable on the character level. A fully connected layer may output a probability for each language type.

Second branch prediction network 606 may only be called when the output of first branch prediction network 604 is Latin-based. Second branch prediction network 606 receives the same feature sequence as first branch prediction network 604. However, second branch prediction network 606 performs a sentence level classification on the feature sequence. In some embodiments, second branch prediction network 606 includes long short term memory network that can classify text into language types, such as Spanish, French, English, etc. For example, second branch prediction network 606 uses vocabulary and special characters in different language types to classify the text input into a Latin-based language type.

Training

Some embodiments may automatically burn in subtitles in videos for training purposes. For example, a caption file may be used to burn in subtitles. This ensures there is a large enough dataset for training.

Conclusion

Accordingly, some embodiments build an end to end solution to detect burned-in subtitles. Frame level and video level detection generates more accurate results to detect burn-in subtitles. Further, upon detecting a video with burned-in subtitles, the system can detect a language type for the subtitles using a multiple branch prediction network.

System

Figure 7:
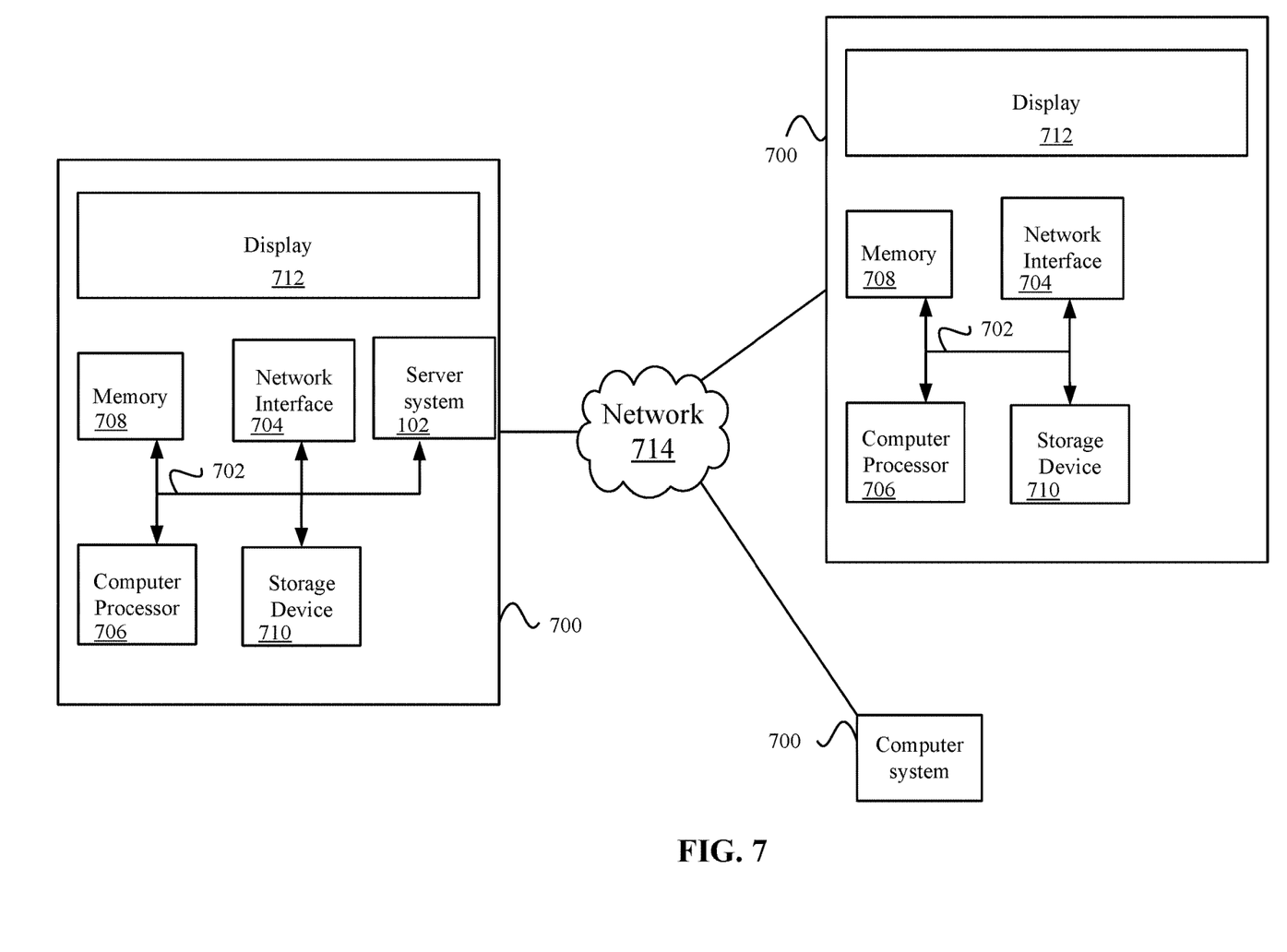
FIG. 7 illustrates an example of special purpose computer systems configured with a server system according to one embodiment.

FIG. 7 illustrates an example of special purpose computer systems 700 configured with a server system 102 according to one embodiment. Computer system 700 includes a bus 702, network interface 704, a computer processor 706, a memory 708, a storage device 710, and a display 712.

Bus 702 may be a communication mechanism for communicating information. Computer processor 706 may execute computer programs stored in memory 708 or storage device 708. Any suitable programming language can be used to implement the routines of some embodiments including C, C++, Java, assembly language, etc. Different programming techniques can be employed such as procedural or object oriented. The routines can execute on a single computer system 700 or multiple computer systems 700. Further, multiple computer processors 706 may be used.

Memory 708 may store instructions, such as source code or binary code, for performing the techniques described above. Memory 708 may also be used for storing variables or other intermediate information during execution of instructions to be executed by processor 706. Examples of memory 708 include random access memory (RAM), read only memory (ROM), or both.

Storage device 710 may also store instructions, such as source code or binary code, for performing the techniques described above. Storage device 710 may additionally store data used and manipulated by computer processor 706. For example, storage device 710 may be a database that is accessed by computer system 700. Other examples of storage device 710 include random access memory (RAM), read only memory (ROM), a hard drive, a magnetic disk, an optical disk, a CD-ROM, a DVD, a flash memory, a USB memory card, or any other medium from which a computer can read.

Memory 708 or storage device 710 may be an example of a non-transitory computer-readable storage medium for use by or in connection with computer system 700. The non-transitory computer-readable storage medium contains instructions for controlling a computer system 700 to be configured to perform functions described by some embodiments. The instructions, when executed by one or more computer processors 706, may be configured to perform that which is described in some embodiments.

Computer system 700 includes a display 712 for displaying information to a computer user. Display 712 may display a user interface used by a user to interact with computer system 700.

Computer system 700 also includes a network interface 704 to provide data communication connection over a network, such as a local area network (LAN) or wide area network (WAN). Wireless networks may also be used. In any such implementation, network interface 704 sends and receives electrical, electromagnetic, or optical signals that carry digital data streams representing various types of information.

Computer system 700 can send and receive information through network interface 704 across a network 714, which may be an Intranet or the Internet. Computer system 700 may interact with other computer systems 700 through network 714. In some examples, client-server communications occur through network 714. Also, implementations of some embodiments may be distributed across computer systems 700 through network 714. Some embodiments may be implemented in a non-transitory computer-readable storage medium for use by or in connection with the instruction execution system, apparatus, system, or machine. The computer-readable storage medium contains instructions for controlling a computer system to perform a method described by some embodiments. The computer system may include one or more computing devices. The instructions, when executed by one or more computer processors, may be configured to perform that which is described in some embodiments.

As used in the description herein and throughout the claims that follow, "a", "an", and "the" includes plural references unless the context clearly dictates otherwise. Also, as used in the description herein and throughout the claims that follow, the meaning of "in" includes "in" and "on" unless the context clearly dictates otherwise.

The above description illustrates various embodiments along with examples of how aspects of some embodiments may be implemented. The above examples and embodiments should not be deemed to be the only embodiments and are presented to illustrate the flexibility and advantages of some embodiments as defined by the following claims. Based on the above disclosure and the following claims, other arrangements, embodiments, implementations and equivalents may be employed without departing from the scope hereof as defined by the claims.

What is claimed is:

1. A method comprising:
   detecting, by a computing device, a first set of frames in a video that include lines of text, the detecting performed at a frame level on each individual frame;
   generating, by the computing device, a first representation from at least a first portion of the first set of frames and a second representation from at least a second portion of the first set of frames, the first representation generated based on a space dimension and the second representation generated based on a time dimension;
   filtering, by the computing device, the first representation based on a number of lines of text within a space in the space dimension to select a second set of frames;
   filtering, by the computing device, the second representation based on a number of frames within one or more time intervals in a plurality of time intervals in the time dimension to select a third set of frames; and
   analyzing, by the computing device, frames in both the second set of frames and the third set of frames to determine whether the lines of text in both the second set of frames and the third set of frames are burned-in subtitles.

2. The method of claim 1, wherein detecting the first set of frames comprises analyzing each frame for lines of text without using information from other frames.

3. The method of claim 1, wherein generating the first representation and the second representation comprises analyzing multiple frames from the first set of frames.

4. The method of claim 1, wherein detecting the first set of frames comprises:
   predicting whether lines of characters are present in a frame;
   predicting character positions from the lines of text; and
   connecting the character positions together to form lines of text.

5. The method of claim 1, wherein filtering the first representation based on the number of lines of text within the space in the space dimension comprises:
   summarizing the number of lines of text found in different spaces in the at least the first portion of the first set of frames; and
   selecting the second set of frames based on the number of lines of text found in the space.

6. The method of claim 1, wherein filtering the first representation based on the number of lines of text within the space in the space dimension comprises:
   generating a structure that includes a value for a number of text lines found in different spaces in the at least the first portion of the first set of frames; and
   selecting the second set of frames based on values for the number of text lines found in the space.

7. The method of claim 1, wherein filtering the second representation based on the number of frames within the one or more time intervals in the plurality of time intervals in the time dimension comprises
   summarizing a number of lines of text in the at least the second portion of the first set of frames that are found in different time intervals; and
   selecting the third set of frames based on the number of lines of text in the one or more time intervals.

8. The method of claim 1, wherein filtering the second representation based on the number of frames within the time interval in the plurality of time intervals in the time dimension comprises
   generating a structure that includes a value for a number of lines of text in the at least the first portion of the first set of frames that are found in different time intervals in the plurality of time intervals; and
   selecting the third set of frames based on the number of lines of text in the one or more time intervals.

9. The method of claim 1, wherein filtering the second representation based on the number of frames within the one or more time intervals in the plurality of time intervals in the time dimension comprises
   summarizing a number of frames in the at least the first portion of the first set of frames that are found in different time intervals in the plurality of time intervals; and
   selecting the third set of frames based on the number of frames in the one or more time intervals.

10. The method of claim 1, wherein analyzing the frames in both the second set of frames and the third set of frames to determine whether the lines of text in both the second set of frames and the third set of frames are burned-in subtitles comprises:
comparing a number of the frames that are included in both the second set of frames and the third set of frames to a threshold;
determining that the video includes burned-in subtitles when the number of frames is above the threshold; and
determining that the video does not include burned-in subtitles when the number of frames is above the threshold.

11. The method of claim 1, further comprising:
when frames that are included in both the second set of frames and the third set of frames are determined to include burned-in subtitles, analyzing the burned-in subtitles to determine a language type of the burned-in subtitles.

12. The method of claim 11, wherein analyzing the burned-in subtitles comprises:
analyzing the burned-in subtitles for a character type; and
when the character type is associated with a language in a plurality of languages, outputting the language associated with the character type.

13. The method of claim 12, wherein analyzing the burned-in subtitles comprises:
when the character type is associated with multiple languages, analyzing words of the burned-in subtitles to select a language within the multiple languages.

14. The method of claim 1, wherein generating the first representation from at least the first portion of the first set of frames and the second representation from at least the second portion of the first set of frames comprises:
generating the first representation from the first set of frames; and
generating the second representation from the second set of frames.

15. The method of claim 1, wherein generating the first representation from at least the first portion of the first set of frames and the second representation from at least the second portion of the first set of frames comprises:
generating the second representation from the first set of frames; and
generating the first representation from the second set of frames.

16. A non-transitory computer-readable storage medium containing instructions, that when executed, control a computer system to be operable for:
detecting a first set of frames in a video that include lines of text, the detecting performed at a frame level on each individual frame;
generating a first representation from at least a first portion of the first set of frames and a second representation from at least a second portion of the first set of frames, the first representation generated based on a space dimension and the second representation generated based on a time dimension;
filtering the first representation based on a number of lines of text within a space in the space dimension to select a second set of frames;
filtering the second representation based on a number of frames within one or more time intervals in a plurality of time intervals in the time dimension to select a third set of frames; and
analyzing frames in both the second set of frames and the third set of frames to determine whether the lines of text in both the second set of frames and the third set of frames are burned-in subtitles.

17. The non-transitory computer-readable storage medium of claim 16, wherein:
detecting the first set of frames comprises analyzing each frame for lines of text without using information from other frames, and
generating the first representation and the second representation comprises analyzing multiple frames from the first set of frames.

18. The non-transitory computer-readable storage medium of claim 16, wherein filtering the first representation based on the number of lines of text within the space in the space dimension comprises:
summarizing the number of lines of text found in different spaces in the at least the first portion of the first set of frames; and
selecting the second set of frames based on the number of lines of text found in the space.

19. The non-transitory computer-readable storage medium of claim 16, wherein filtering the first representation based on the number of lines of text within the space in the space dimension comprises:
generating a structure that includes a value for a number of text lines found in different spaces in the at least the first portion of the first set of frames; and
selecting the second set of frames based on values for the number of text lines found in the space.

20. An apparatus comprising:
one or more computer processors; and
a non-transitory computer-readable storage medium comprising instructions, that when executed, control the one or more computer processors to be operable for:
detecting a first set of frames in a video that include lines of text, the detecting performed at a frame level on each individual frame;
generating a first representation from at least a first portion of the first set of frames and a second representation from at least a second portion of the first set of frames, the first representation generated based on a space dimension and the second representation generated based on a time dimension;
filtering the first representation based on a number of lines of text within a space in the space dimension to select a second set of frames;
filtering the second representation based on a number of frames within one or more time intervals in a plurality of time intervals in the time dimension to select a third set of frames; and
analyzing frames in both the second set of frames and the third set of frames to determine whether the lines of text in both the second set of frames and the third set of frames are burned-in subtitles.

* * * * *